Jan. 30, 1945.  J. P. KLINGENSMITH  2,368,364
COMBINED FASTENER AND SPACER
Filed Dec. 7, 1943
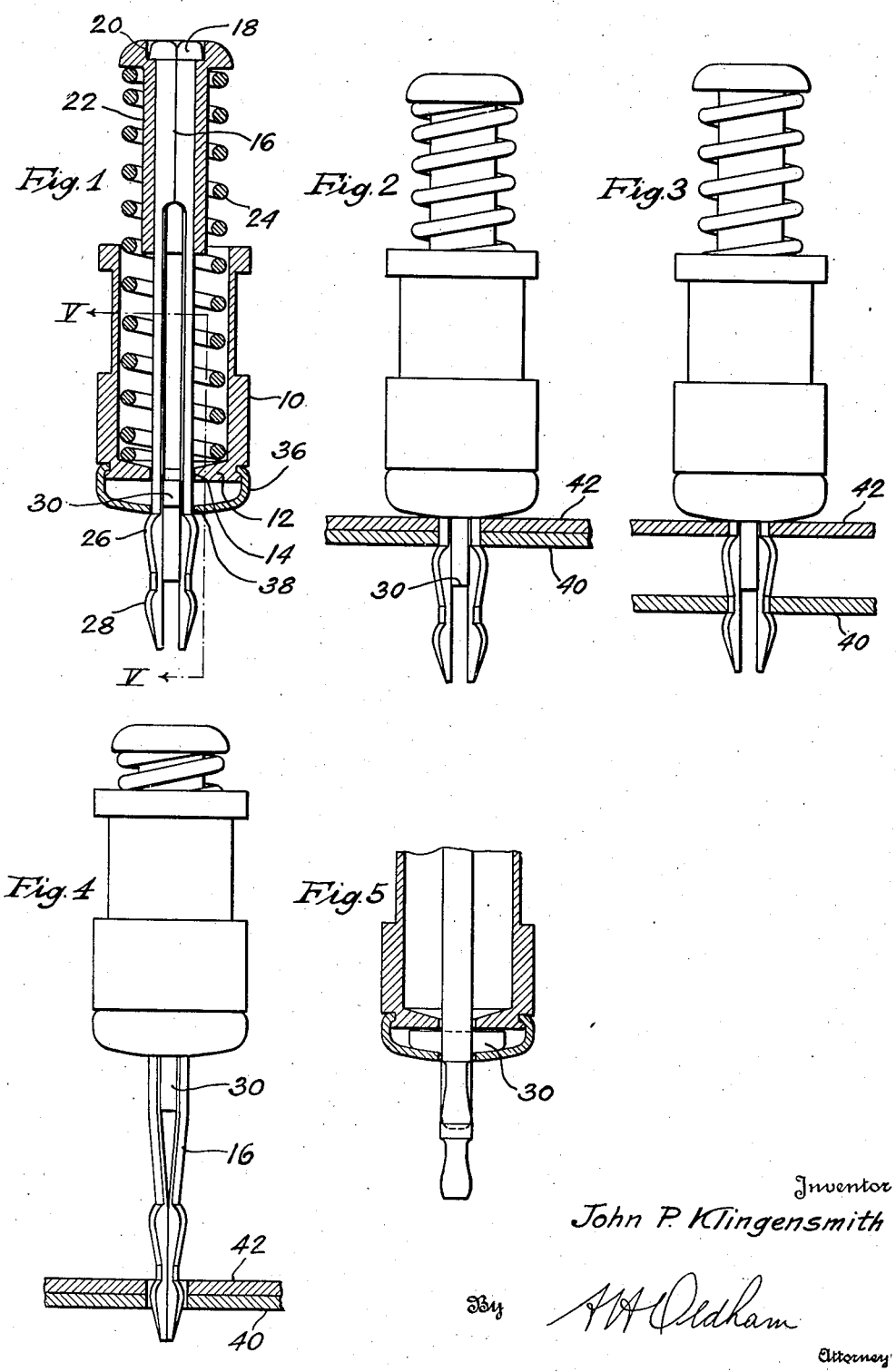
Inventor
John P. Klingensmith
By A. H. Oldham
Attorney Patented Jan. 30, 1945

2,368,364

UNITED STATES PATENT OFFICE 2,368,364

COMBINED FASTENER AND SPACER

John P. Klingensmith, Massillon, Ohio, assignor to Goodyear Aircraft Corporation, Akron, Ohio, a corporation of Delaware Application December 7, 1943, Serial No. 513,228

10 Claims. (Cl. 85—5)

This invention relates to a combined fastener and spacer for holding apart or securing together sheets and similar work parts of a structural assembly, particularly aircraft and like assemblies. Further, the invention is concerned with the method of using the improved fastener and spacer whereby to clamp the work parts together for working operations, then to space parts a suitable distance from each other, especially for the purpose of etching, washing, and drying their entire surfaces, and then to reclamp the parts together for welding purposes without changing their overlapping position relative to each other, that is, without the necessity of removing the fastener completely from its hole and then re-inserting it, as is the case with other fasteners.

Combination fasteners and spacers are of great advantage for electric resistance welding of aluminum alloys, because the material, in order to be welded properly, requires a thorough cleaning before welding. The cleaning or etching is for the purpose of removing the oxide film on the surface so that better welds can be obtained. It is not a satisfactory practice to dip such an assembly into an etching solution with its parts in close touch, since it is difficult for the solution to reach the hidden surfaces and it is difficult to remove the solution by a water bath and to completely dry the assembly.

All of these difficulties are avoided by the fastener constructed according to this invention, which fastener is an improvement over previous constructions used, because the improved fastener is adapted, not only to releasably fasten several parts together, but also is capable of holding them in spaced relation during a particular working process.

This latter adaptation is important and of great service, for instance, for etching, washing, and drying the surfaces of the parts to obtain uniform spot welds. With the parts spaced apart the etching solution, as well as the rinsing water and drying air have easy access to all metal surfaces. After the drying process the parts are again clamped together without removing the fasteners. Thus, the complete taking apart of an assembly to be welded is obviated before, during, or after cleaning, and the parts, after having once been assembled correctly, cannot be misaligned again, so that a great deal of time and labor is saved thereby, and the surfaces once cleaned and to be welded never need to be touched again.

In case more than two thicknesses of material are to be welded together, it will generally be quite sufficient to hold one thickness in a fixed position in relation to the clamp and the other thicknesses loosely spaced therefrom, so that the relatively loose sheets will separate from each other when the assembly is moved in the etching or water bath, or while being dried. It may be arranged also that each sheet thickness or work part may be fully separated from an adjacent one.

The object of this invention is the construction of a fastener adapted to clamp together two or more sheet-like parts and which is capable of being clamped to one part and to hold the released parts in spaced relation to the first part for etching, washing, and drying.

Another object of this invention is the provision of a combined fastener and spacer permitting the clamping together of at least two sheet metal parts and the like, and, after releasing the clamping action, holding the sheets in spaced relation to each other while being etched, washed and dried for the purpose of subsequent electric resistance welding.

Another object of the invention is to provide a relatively inexpensive, long-lived, and readily operated mechanism for clamping sheets and the like together or in spaced relation.

Another object of this invention is the saving of time and labor by providing a process for preparing sub-assemblies composed of sheet metal parts and the like for the purpose of obtaining uniform electrical skin resistance all over the surface of parts.

Another object of the invention is the provision of an easily practiced, rapid, efficient, and inexpensive method for facilitating assembly and welding or like operations on sheet metal or other work parts.

For a better understanding of this invention, reference should now be had to the accompanying drawing, of which:

Fig. 1 is a longitudinal sectional view of one typical embodiment of the invention;

Fig. 2 is a side view of the mechanism of Fig. 1 in clamping position;

Fig. 3 is a view similar to Fig. 2 but illustrating the mechanism in spacing position;

Fig. 4 is an elevational view of the mechanism just as it is being inserted into a hole for clamping two sheets together; and Fig. 5 is a fragmentary sectional side view of Fig. 1 taken on line V—V thereof.

Viewing the drawing, the particular form of the combined fastener and spacer illustrated therein comprises a cylindrical housing 10 open at one end and including an end wall 12 provided with a hole 14 through which passes a split pin 16 made either in one or two pieces. This split pin generally consists of spring material, is provided with a head 18 which rests in a socket 20 of a headed sleeve 22 working against a spring 24 seated on the end wall 12 of the housing. The other end of the split pin is provided on each of its legs with two or more lateral extensions 26 and 28 arranged in spaced relation. As shown, the extensions 26 on the legs are opposed to each other, as are the extensions 28, so that the opposed extensions form cooperating clamping shoulders. The legs, spaced from each other, are separated in retracted position by a flat T-shaped spacer or wedge 30 which is conveniently held between the outside of the end wall 12 of the housing 10 and a cap 36 spaced therefrom and crimped into a groove of the housing side wall. This cap 36 has a center hole 38 of substantially pin diameter through which the pin 16 passes.

The lateral pin extensions 26 and 28 form the actual clamping elements or shoulders of the fastener when the pin is in retracted position, under the influence of the spring 24, as best shown in Fig. 2, in which two sheets are releasably fastened together. When the sleeve 22 is pressed against the spring, usually by a special hand tool, the pin 16 is moved sufficiently over and beyond the tongue end of the spacer 30 so that the free ends of the pin legs come close together by their inherent resiliency, whereby the lateral extensions 26 and 28 will clear the hole in the sheet into which the fastener is placed. Releasing the spring 24, the pin is retracted and the spreader pushes the pin legs apart and clamps the sheets together. This is the very same process as performed by previous similar fastener constructions.

Now, the advantage of this invention over previous fastener constructions is the addition of one or more pairs of lateral pin extensions, such as the extensions 28, suitably spaced from the extensions 26. As shown in Fig. 3, the sheets 40 and 42, originally clamped together, have been separated from each other and are held apart by the clamp, the one clamped against housing 10 and the other one being held loosely or resiliently on the pin between the two pairs of lateral extensions 26 and 28. These extensions may be spaced sufficiently apart to permit holding loosely or resiliently two or more sheets with enough space between each other for easy access of the etching fluid, of water for removing the fluid, and of air for drying the water upon agitation of the sheets. After the drying process, the parts are brought back into position, as shown in Fig. 2, and the assembly is ready for electric resistance welding.

When only two sheets are spaced apart, as in Fig. 3, the second sheet may be held loosely or it may be held resiliently, whichever is desired. However, when more than two sheets are spaced apart in conjunction with only two pairs of shoulders or extensions, they should be held loosely so that agitation will result in proper clearance for satisfactory etching, washing, and drying.

When more than two pairs of extensions or shoulders are used to space more than two work parts, such work parts can be gripped more resiliently by the legs of the pin.

From the foregoing description, it will be evident that the fastener according to this invention is a considerable improvement over previous constructions, since it saves the taking apart of an assembly and the reassembling thereof during the construction of an assembly which requires a work-cleaning and spot-welding operation. The prior art practice of assembly and disassembly for cleaning often has resulted in recontamination of the surfaces. In the use of the fastener and method of the invention, such recontamination is avoided. Furthermore, there is no opportunity of faulty reassembling after once the assembly has been put together right. A great deal of time, labor, and inconvenience is saved with this improved device, and production can be considerably increased.

It is to be understood that this invention is not restricted to the example shown in the drawing, but that many modifications therefrom may be made without deviating from the spirit and scope of the appended claims.

I claim:

1. A combined fastener and spacer comprising a casing, a pair of legs movable into and out of the casing, spring means normally urging the legs into the casing, means for moving the legs apart as they move into the casing, a pair of cooperating shoulders on the legs adjacent the ends thereof remote from the casing, and a second pair of cooperating shoulders on the legs spaced from the first-mentioned pair.

2. A combined fastener and spacer comprising a casing, a pair of legs movable into and out of the casing, spring means normally urging the legs into the casing, means for moving the legs apart as they move into the casing, and a pair of spaced apart shoulders on each leg.

3. A combined fastener and spacer for sheet metal and like work parts, including a pair of spring legs adapted to be moved into a hole in the work parts, means for moving the legs apart to engage them with the sides of the hole in the work parts, means on the legs for holding the work parts in spaced-apart relation, and means associated with the legs against which at least one of the work parts is clamped by the legs.

4. A combined fastener and spacer for sheet metal and like work parts, including a pair of legs adapted to be moved into a hole in the work parts, means for moving the legs apart to engage them with the sides of the hole in the work parts, and means on the legs for holding the work parts in spaced-apart relation.

5. A combined spacer and clamp comprising a housing, pin means movable into and out of the housing, means normally urging the pin into the housing, means for expanding the pin means when it is moved into the housing, and a plurality of shoulders on the pin means for clamping work parts together or in spaced relation.

6. A combined spacer and clamp for work parts and including means adapted to be extended into a pair of aligned holes in the work parts, a plurality of pairs of shoulders on said means to provide for positioning the work parts together or apart, and means for expanding said means.

7. A combined fastener and spacer for uniting, spacing, and reuniting parts of a sheet metal assembly, comprising a tubular casing open at one end, and a spring-controlled, split retaining pin longitudinally movable in said casing and having spaced legs, provided at their free ends, passing through the wall at the other end of the casing, with a plurality of spaced transverse outward extensions, one set of said extensions cooperating with the walled end of said casing to have clamped therebetween at least one of said parts, and the remaining sets of said transverse extensions being adapted for spacing adjacent parts of said assembly, while otherwise said parts remain in the same position relative each other, and to reunite said parts without changing their relative position in the plane vertical to said spacing.

8. A combined spacer and clamp for work parts and including means adapted to be extended into aligned holes in the work parts, spaced-apart shoulders on said means to provide for positioning the work parts together or apart, and means for moving said means into work-gripping relation.

9. A fastener for clamping together a plurality of parts of sheet metal and the like, comprising a casing, a spacer inserted in and extending through an aperture in said casing and spring-controlled resilient retaining means passing at both sides of said spacer and extending through said aperture and being longitudinally movable in and cooperating with said casing to hold said parts together, spaced lateral extensions on said retaining means and said fastener being adapted to be clamped to at least one of said parts and holding at the same time at least one other of said parts in spaced relation, said extensions permitting said parts to be re-united without changing their relative position to the plane vertical to said spacing.

10. A fastener for clamping together and spacing parts of sheet metal and the like, comprising a casing, a spacer inserted in and extending through an aperture in said casing and a spring-controlled resilient split retaining pin passing at both sides of said spacer and extending through said aperture, being longitudinally movable in and cooperating with said casing to clamp said parts together, spaced lateral extensions on said retaining pin and said fastener being adapted to be clamped to at least one of said parts and holding simultaneously at least one of said parts in spaced relation, while otherwise said parts remain in the same position relative to each other, said extensions permitting said parts to be united without changing their relative overlapping position.

JOHN P. KLINGENSMITH.